(12) United States Patent
Karni et al.

(10) Patent No.: US 8,764,953 B2
(45) Date of Patent: Jul. 1, 2014

(54) SYSTEM AND METHOD FOR CHEMICAL POTENTIAL ENERGY PRODUCTION

(75) Inventors: Jacob Karni, Rehovot (IL); Gidon Ferdiman, Rehovot (IL); Yury Alioshin, Rehovot (IL)

(73) Assignee: Yeda Research and Development Company Ltd., Rehovot (IL)

( * ) Notice: Subject to any disclaimer, the term of this patent is extended or adjusted under 35 U.S.C. 154(b) by 0 days.

(21) Appl. No.: 13/593,009

(22) Filed: Aug. 23, 2012

(65) Prior Publication Data

US 2013/0043138 A1 Feb. 21, 2013

Related U.S. Application Data

(63) Continuation of application No. 13/010,582, filed on Jan. 20, 2011, now Pat. No. 8,268,138.

(51) Int. Cl.
*C25B 1/04* (2006.01)
*C25B 9/08* (2006.01)
*C25B 1/00* (2006.01)

(52) U.S. Cl.
CPC .. *C25B 1/003* (2013.01); *C25B 9/08* (2013.01)
USPC ............ 204/266; 205/340; 205/628; 205/637

(58) Field of Classification Search
CPC ................................. C25B 1/003; C25B 9/08
USPC .......................... 204/266; 205/340, 628, 637
See application file for complete search history.

(56) References Cited

U.S. PATENT DOCUMENTS

| | | | |
|---|---|---|---|
| 4,545,872 A | * | 10/1985 | Sammells et al. ............ 205/340 |
| 5,973,825 A | * | 10/1999 | Lasich .......................... 359/353 |
| 6,503,584 B1 | | 1/2003 | McAlister |
| 7,033,470 B2 | * | 4/2006 | Mazanec et al. ............. 204/295 |
| 7,951,283 B2 | | 5/2011 | Stoots |
| 8,083,904 B2 | | 12/2011 | Mofakhami |
| 2003/0098232 A1 | | 5/2003 | Roe |
| 2004/0202914 A1 | * | 10/2004 | Sridhar et al. .................. 429/34 |
| 2004/0265137 A1 | | 12/2004 | Bar-Gadda |
| 2007/0045125 A1 | | 3/2007 | Hartvigsen |

(Continued)

FOREIGN PATENT DOCUMENTS

JP 59157976 A 9/1984
JP 2004076102 A 3/2004

(Continued)

OTHER PUBLICATIONS

International Search Report filed in International Application No. PCT/IL2009/000743 on Jan. 14, 2010.

(Continued)

*Primary Examiner* — Nicholas A Smith
(74) *Attorney, Agent, or Firm* — Browdy and Neimark, PLLC (57) ABSTRACT

The present invention relates to a system comprising a heat source to provide heat at the desired temperature and energy field (e.g. a solar concentrator); an electron source configured and operable to emit electrons; an electric field generator generating an electric field adapted to supply energy sufficient to dissociate gas molecules; and a reaction gas chamber configured and operable to cause interaction between the electrons with the molecules, such that the electrons dissociate the molecules to product compound and ions via dissociative electrons attachment (DEA) within the chamber.

5 Claims, 7 Drawing Sheets

(56) References Cited

U.S. PATENT DOCUMENTS

| | | | |
|---|---|---|---|
| 2007/0054170 A1 | 3/2007 | Isenberg | |
| 2007/0163889 A1 | 7/2007 | Kato et al. | |
| 2008/0135403 A1* | 6/2008 | Jang et al. | 204/274 |

FOREIGN PATENT DOCUMENTS

| | | |
|---|---|---|
| JP | 4165265 A | 10/2004 |
| JP | 2005232525 A | 9/2005 |
| WO | 2007025280 A2 | 3/2007 |
| WO | 2007077366 A2 | 7/2007 |
| WO | 2008016728 A2 | 2/2008 |
| WO | 2009012154 A2 | 1/2009 |
| WO | 2009048685 A1 | 4/2009 |

OTHER PUBLICATIONS

Akikusa, J. et al., "Photoelectrolysis of water to hydrogen in p-SiC/Pt and p-SiC/n-TiO2 cells," International Journal of Hydrogen Energy, vol. 27, 2002, pp. 863-870.

Dey, G.R. et al., "Photo-catalytic reduction of carbon dioxide to methane using TiO2 as suspension in water," Journal of Photochemistry and Photobiology A: Chemistry, vol. 163, 2004, pp. 503-508.

Diver, R.B. et al., "Development of a Cr5 Solar Thermochemical Heat Engine Prototype," Concentrated Solar Symposium, Mar. 2008, Las Vegas, Nevada, pp. 1-9.

Eguchi, K. et al., "Performance Analysis of FGM-Based Direct Energy Conversion System for Space Power Applications," 3rd International Symposium on Structural and Functional Gradient Materials, Swiss Federal Institute of Technology of Lausanne, Switzerland, Section V.4, Oct. 10-12, 1994, pp. 619-625.

Epstein, M. et al., "Towards the Industrial Solar Carbothermal Production of Zinc," Journal of Solar Energy Engineering, vol. 130, Feb. 2008, pp. 014505-1 to 014505-4.

Fletcher, E. A, "Solarthermal Processing: A Review," Journal of Solar Energy Engineering, vol. 123, May 2001, pp. 63-74.

Hori, Y. et al., "Silver-coated ion exchange membrane electrode applied to electrochemical reduction of carbon dioxide," Electrochimica Acta, vol. 48, 2003, pp. 2651-2657.

Ibragimova, L.B. et al., "Dissociation of CO2 Molecules in a Wide Temperature Range," High Temperature, vol. 38, No. 1, 2000, pp. 33-36.

Kaneco, S. et al., "Photocatalytic reduction of CO2 using TiO2 powders in supercritical fluid CO2," Energy, vol. 24, 1999, pp. 21-30.

Naito, H. et al., "Development of a Solar Receiver for a High-Efficiency Thermionic/Thermoelectric Conversion System," Solar Energy, vol. 58, No. 4-6, 1996, pp. 191-195.

Rubin, R. et al., "Chemical Kinetics Simulation of High Temperature Hydrocarbons Reforming in a Solar Reactor," Journal of Solar Energy Engineering, vol. 126, Aug. 2004, pp. 858-866.

Steinfeld, A., "Solar thermochemical production of hydrogen—a review," Solar Energy, vol. 78, 2005, pp. 603-615.

Sterling, AD., "World's largest solar installation to use Stirling engine Technology," Pure Energy Systems News, 2005, Aug. 11, 2005, (http://pesn.com/2005/08/1119600147 Edison_Stirling_largest_solar/), 9 pages.

Stevens, G. et al., "Energy storage by the electrochemical reduction of CO2 to CO at a porous Au film," Journal of 14 Electroanalytical Chemistry, vol. 526, 2002, pp. 125-133.

Stoots, C. M. et al., "Idaho National Laboratory Experimental Research in High Temperature Electrolysis for Hydrogen and Syngas Production," Proceedings of the 4th International Topical Meeting on High Temperature Reactor Technology HTR2008, Sep. 28-Oct. 1, 2008, Washington, DC USA, 12 pages.

Yoneyama, H., "Photoreduction of carbon dioxide on quantized semiconductor nanoparticles in solution," Catalysis Today, vol. 39, 1997, pp. 169-175.

* cited by examiner

SYSTEM AND METHOD FOR CHEMICAL POTENTIAL ENERGY PRODUCTION

FIELD OF THE INVENTION

This invention generally relates to a system and method for chemical potential energy production

REFERENCES

The following references are considered to be pertinent for the purpose of understanding the background of the present invention:
1. Rubin, R., Karni, J. and Yeheskel, J., (2004) "Chemical Kinetics Simulation of High Temperature Hydrocarbons Reforming Using a Solar Reactor," *J. Solar Energy Engineering* 126(3), pp. 858-866.
2. Fletcher, E. A., (2001) "Solarthermal Processing: A Review," *J. Solar Energy Engineering* 123(2), pp 63-74.
3. Steinfeld, A., (2005) "Solar Thermochemical Production of Hydrogen-a Review," *Solar Energy*, 78, pp. 603-615.
4. Epstein M., Olalde G, Santen S., Steinfeld A., Wieckert C, (2006) "Towards an Industrial Solar Carbothermic Production of Zinc," 13$^{th}$ *International Symposium on Concentrating Solar Power and Chemical Energy Technologies*, Seville, June 2006, ISBN: 84-7834-519-1, paper #FB2-S6
5. Yoneyama, H., (1997) "Photoreduction of carbon dioxide on quantized semiconductor nanoparticles in solution," *Catalysis Today*, 39(3), pp. 169-175.
6. Kaneco, S., Kurimoto H., Shimizu Y., Ohta K. and and Mizuno T., (1999) "Photocatalytic reduction of $CO_2$ using $TiO_2$ powders in supercritical fluid $CO_2$," *Energy*, 24(1), pp. 21-30.
7. Jun Akikusa, S.U.M.K., (2002) "Photoelectrolysis of water to hydrogen in p-SiC/Pt and p-SiC/n-$TiO_2$ cells," *Int. J. Hydrogen Energy* 27, pp. 863-870.
8. G. B. Stevens, T. Reda, B. Raguse, (2002) "Energy storage by the electro chemical reduction of $CO_2$ to CO at a porous Au film", Journal of Electrochemical Chemistry, 526, pp. 125-133.
9. Hori Y., Ito H., Okano K., Nagasu K. and Sato S., (2003) "Silver-coated ion exchange membrane electrode applied to electrochemical reduction of carbon dioxide", Electrochimica Acta, 48, pp. 2651-2657.
10. Dey G R., Belapurkar A. D. and Kishore K., (2004) "Photo-catalytic reduction of carbon dioxide to methane using $TiO_2$ as suspension in water", Journal of Photochemistry and Photobiology A: chemistry, 163, pp. 503-508.
11. Eguchi K., Hochino T. and Fujihara, (1995) "Performance Analysis of FGM-Based Direct Energy Conversion System for Space Power Applications," *Proceedings of FGM '94*, edited by B. Ilschner and N. Cherradi (Polytechnic University Romandes Press, Lausanne, Switzerland, 1995), pp. 619-625.
12. Naito H., Kohsaka Y., Cooke D. and Arashi H., (1996) "Development of a Solar Receiver for a High-Efficiency Thermionic/Thermoelectric Conversion System," *Solar Energy*, 58, No. 4-6, pp. 191-195.
13. Ibragimova L. B., Smekhov G. D., Shatalov O. P., Eremin A. V. and Shumova V. V., (2000) "Dissociation of $CO_2$ Molecules in a Wide Temperature Range," High Temperature, Vol. 38, No. 1, pp 33-36

BACKGROUND OF THE INVENTION

The abundant, low-cost production of potent fuels, which can be used in intrinsically clean energy processes, i.e. processes which do not produce and emit greenhouse gases and other pollutants is a challenging task.

Steam reforming is generally used to produce hydrogen from hydrocarbons. Steam reforming of natural gas, sometimes referred to as steam methane reforming (SMR), is the most common method of producing commercial bulk hydrogen, as well as hydrogen, used in the industrial synthesis of ammonia.

The steam reforming of methane and other hydrocarbons (Reaction 1 below), is generally followed by a water shift reaction to convert CO to $H_2$. The syn-gas (i.e. synthetic mixture of hydrogen and carbon monoxide) produced in the reforming process, can also be used as enriched gas fuel, or converted to liquid fuels such as methanol. Methane $CH_4$ can be reformed with steam or carbon dioxide to form a mixture of carbon monoxide and hydrogen (syn-gas) as follows:

$$CH_4+H_2O \Leftrightarrow CO+3H_2 \ \Delta H=206.2 \text{ kJ/mol} \quad (1)$$

$$CH_4+CO_2 \Leftrightarrow 2CO+2H_2 \ \Delta H=247.3 \text{ kJ/mol} \quad (2)$$

where $\Delta H$ is the enthalpy of the reaction. At high temperatures (700-1100° C.) and in the presence of a metal-based catalyst, steam reacts with methane to yield carbon monoxide and hydrogen.

GENERAL DESCRIPTION

One clean fuel production process is solar-driven methane reforming which has been studied extensively [1]. Reaction (2) above can be reversed to produce energy upon demand, to operate in a closed loop, and therefore to provide a means for storage and transportation of solar energy. Reactions with solids such as metal oxides and carbon at high temperature [2-4] provide other solar thermo-chemical cycles for fuel production, without adding $CO_2$ to the environment.

Another example—electrolysis of water—is a simple method for clean fuel (hydrogen) production. However, it has a low attainable efficiency due to the need of using electricity. Recently, Stoots, C. M., O'Brien, J. E., Herring, J. S., Condie, K. G and Hartvigsen, J. J. "Idaho National Laboratory Experimental Research in High Temperature Electrolysis for Hydrogen and Syngas Production," Proceedings of the 4th International Topical Meeting on High Temperature Reactor Technology HTR2008, Sep. 28-Oct. 1, 2008, Washington, D.C. USA have suggested performing high temperature electrolysis, possibly using a clean energy source, such as solar radiation. The higher temperature reduces the amount of electricity required for the process.

Yet another method is thermolysis—heating the substance to a temperature where the free energy is equal or larger than zero and it dissociates spontaneously [2]. Although thermolysis of water/steam or carbon dioxide does not require electricity, it requires very high temperatures of above 3000K and 2500K, respectively.

Another clean fuel production process is the photo-catalytic process, which requires neither electricity, nor high temperature. In this process, a high-energy photon initiates an endothermic reaction that produces fuel. However, the efficiency of this method is very low (about 1%) [5-7].

Multi-stage thermo-chemical processes do not require electricity and have practical working temperatures. For example, some thermo-chemical methods of water decomposition can have up to 50% overall heat-to-hydrogen conversion efficiency and operate in medium-to-high working temperatures (T<1000° C.). However, these processes are complex, and handling of rare, expensive and/or corrosive materials is required. Other multi-stage thermo-chemical processes, at higher temperature, e.g. via metal oxide reduction have also been proposed by [4], and more recently by Diver, R. B., Siegel, N. P., Miller, J. E., Moss, T. A., Stuecker, J. N. and James, D. L., "Development of a Cr5 Solar Thermochemical Heat Engine Prototype," Concentrated Solar Symposium, March 2008, Las Vegas, Nev.

$CO_2$ electrolysis can use different metal electrodes, and liquid or solid polymer electrolytes as shown by [8], and more recently by Stoots, C. M., O'Brien, J. E., Herring, J. S., Condie, K. G. and Hartvigsen, J. J. in the Proceedings of the 4th International Topical Meeting on High Temperature Reactor Technology HTR2008, Sep. 28-Oct. 1, 2008, Washington, D.C. USA. The maximum efficiency of a non-polluting electrolysis system depends on the efficiency of a clean source electricity system, for example, a photovoltaic-driven system. During electrolysis, carbon may deposit on the electrodes, which decreases their efficiency, and eventually stops the process.

Stevens et. al. [8] have shown a current reduction of 40% over 100 min for electrochemical reduction of $CO_2$. According to these experiments, the maximum energy storage efficiency of CO gas (as fuel) was 35%.

Photo-catalytic reduction to CO in high pressure has been investigated by Hori et al. [9] and the direct reduction of $CO_2$ to methane gas was studied by Dey et al. [10]. These processes have low rate reduction and require costly and/or corrosive materials.

There is a need in the art for a novel approach capable of providing an adequate solution for efficient, high rate production of clean and low-cost synthetic fuel.

There is thus provided, according to one broad aspect of the invention, a system for producing one or more compounds with high chemical potential energy, the system comprising: an electron source including a cathode and configured and operable to emit electrons utilizing for example a thermionic (TI) effect; an electric field generator generating an electric field having an energy sufficient to dissociate $CO_2$ and/or $H_2O$ reactant gas molecules; and an anode spaced apart from the cathode at a predetermined distance defining a reaction gas chamber configured and operable to cause interaction between the electrons with $CO_2$ and/or $H_2O$ gas molecules via a dissociative electrons attachment (DEA) mechanism within the chamber, such that electrons having the required energy dissociate $CO_2$ and/or $H_2O$ gas molecules into CO and/or $H_2$ and $O_2$. The reactant gas molecules are therefore at least one of $CO_2$ and $H_2O$ and the product compounds are $O_2$ and at least one of CO and $H_2$.

In some embodiments, the electric field generator is exposed to thermal energy emitted from at least one of the electron source and a thermal energy source.

In some embodiments of the invention, the system includes a thermal energy source (heat source) configured and operable to supply thermal energy (radiation) to the electron source thereby raising the electron source temperature and generating thermionic (TI) electrons emission and/or to an electric field generator (e.g. single or plural thermoelectric devices and/or cascades, or a single or plural Stirling Engine) for generating an electric field.

Therefore, in some embodiments, the electric field generator comprises at least one thermoelectric device and/or cascade of thermoelectric devices and operates for utilizing temperature difference generated by the thermal energy source. Alternatively, the electric field generator comprises at least one Stirling engine operating for utilizing temperature difference generated by the thermal energy source.

In some embodiments of the invention, the system includes, instead of just the anode described above, an intermediate electrode adjacent to a gas components separator (e.g. a membrane), both placed in between the anode and the cathode. This configuration enables (a) an additional means of $CO_2$ or $H_2O$ dissociation, via electrolysis, and (b) a means for separating between the product compounds of CO and $H_2$ in one side, and $O_2$ in the other side. Therefore, the intermediate electrode is configured and operable to dissociate the reactant gas molecules via electrolysis on the surface of the separator and the gas components separator is configured and operable to separate between $O_2$ and the other product compounds.

The inlet reactant gas is either $CO_2$, or $H_2O$ or both. The $CO_2$, and $H_2O$ may be introduced into the process on the same side of the separation membrane, or on opposite sides of it. The product compounds exiting the reaction chamber are either CO or $H_2$, or a mixture of both of them. The ions conducted in the membrane are either negative oxygen ions, or protons ($H^+$), or both. Oxygen molecules exit the system on the anode side.

The present invention combines photo, thermal, electric and chemical (PTEC) processes to develop a new method, maximizing the efficiency and the conversion rate of thermal radiation to chemical potential, in the form of $CO_2$ reduction to CO and $O_2$ and $H_2O$ reduction to $H_2$ and $O_2$ in the same system. The dissociation of $CO_2$ and $H_2O$ may occur in the same system simultaneously or either one of them can be preformed alone. The ratio of CO to $H_2$ is controlled during the process and the mixture of carbon monoxide and hydrogen can be used directly as a synthesis gas (syn-gas) gaseous fuel (e.g. in power or chemical plants), or converted to methanol or other hydrocarbons, which can be used, for example, as transportation fuels. The $CO_2$ and water generated during the burning of these fuels can be trapped, returned to the power plant and reduced again. This method enables clean fuel production on a very large-scale, wherever thermal energy is available.

In some embodiments, the system comprises a gas components separator configured and operable to separate between the oxygen ions and CO and/or $H_2$ molecules resulting from $CO_2$ and/or $H_2O$ dissociation. The separator may comprise a membrane configured for allowing only certain gas component such as oxygen ions ($O^-$) to pass therethrough (e.g. transmitting negative oxygen ions). Such membranes may be made of ceramic material, such as for example, Yitria Stabilized Zriconia (YSZ). Its surface facing the chamber containing $CO_2$ has a cathode and the other surface has an anode to extract the electrons from the oxygen ions, attached to a means to transfer these electrons back to the cathode.

In some embodiments of the invention, both the $CO_2$ and the $H_2O$ are supplied to the system on the cathode side of the membrane. In this case, the separator is used to separate $O^-$ ions from the $H_2$ and CO; it conducts $O^-$ ions from the cathode to the anode. The rates of $CO_2$ and $H_2O$ dissociation are controlled by the working temperature and by the flow rate of $CO_2$ and $H_2O$ entering the cathode side.

In another embodiment of the invention, the $CO_2$ is supplied to the system on the cathode side of the membrane and $H_2O$ is supplied to the system on the anode side of the membrane. In this case, the separator can be used to separate $H^+$ ions (protons) from $OH^-$. The same separator can be used to conduct simultaneously $O^-$ ions from the cathode to the anode side and $H^+$ ions from the anode to the cathode side. These ion conductions can be done in both directions simultaneously, or in each direction separately. The rates of the $O^-$ and $H^+$ ion conductions are controlled by the working temperature and by the flow rate of $CO_2$ on the cathode side and $H_2O$ on the anode side.

In another embodiment of the invention, the system includes a thermal energy source (heat source) configured and operable to supply thermal energy (e.g. concentrated sunlight radiation) to the heating elements of at least one Stirling engine, which generates an electric field at a relatively high efficiency.

In another embodiment of the invention, the system includes a separated means of generating the electric field (e.g. a separated solar electric generating system).

The thermal (heat) source may include a solar energy collector, which may for example include a set of reflectors configured to collect sunlight radiation, concentrate it and reflect it towards the electron source.

In some embodiments of the invention, the electron source includes a thermionic cathode or a photocathode. The thermionic cathode may be associated with the electric field generator or a separate electric field generator operable to apply an electric potential onto the electron source, reducing the potential barrier of the cathode and enhancing the number of emitted electrons.

In some embodiments, the thermionic cathode is coated by a protective coating, to be protected from exposure to gaseous environment including $CO_2$, CO, O$^-$ and $O_2$. The protective coating may include an oxide metal layer, and may be configured to enable electron transmission via tunneling by reducing the work function of the cathode.

In some embodiments of the invention, the system includes a magnetic field source, operable to adjust the electron motion such that it maximizes the probability of the electron —$CO_2$ dissociative attachment reaction.

In some embodiments of the invention, the $CO_2$ gas is pre-heated by the gases and/or by the hot-side of the reactor walls before entering the reaction chamber.

In some embodiments of the invention, the $CO_2$ gas is excited by exposure to at least one of radiation electron beam (e.g. from a laser source), magnetic field, and electric field, that increases its vibration energy as it enters the reaction chamber. This improves the probability of the electron —$CO_2$ dissociative attachment reaction.

Preferably, the system includes an electron collector configured and operable to collect the emitted electrons, which do not combine with the $CO_2$ molecules.

The system of the invention is operable with high heat-to-chemical potential conversion efficiency, estimated to reach above 40%, and is operable at temperatures in the range of about 600° C.-1500° C.

In some embodiments, the electron source, the electric field generator, the reaction gas chamber and the membrane are integrated in a single module (e.g. cell).

According to another broad aspect of the present invention, there is also provided a system for producing one or more compounds with high chemical potential energy. The system comprises an electron source including a cathode and configured and operable to emit electrons; an electric field generator generating an electric field; an anode spaced apart from the cathode; an intermediate electrode and a gas components separator both placed in between the anode and the cathode; the intermediate electrode being configured and operable to dissociate the reactant gas molecules via electrolysis on the surface of the separator; the reactant gas molecules being at least one of $CO_2$ and $H_2O$, the product compounds are $O_2$ and at least one of CO and $H_2$ respectively.

It should be noted that the system of the present invention provides one or more product compounds having relatively high energy of formation from one or more chemical compounds having relatively low energy of formation. The chemical potential energy of the product compounds can be transformed to other forms of energy such as heat, work or electricity by a chemical reaction.

According to another broad aspect of the present invention, there is provided a method for production of one or more compounds with high chemical potential energy. The method comprises supplying $CO_2$ (e.g. by separating it from other combustion emission gases) and/or $H_2O$ reactant gas molecules to a reactor including a cathode an anode and a separator in between the anode and the cathode; applying an electric field between the anode and the cathode having an energy sufficient to dissociate reactant gas molecules via a dissociative electrons attachment (DEA) mechanism and/or to reduce the reactant gas molecules by electrolysis; separating between $O_2$ and the other product compounds molecules; and discharging the product compounds molecules.

The dissociation/reduction of $CO_2$ to CO and $O_2$ and of $H_2O$ to $H_2$ and $O_2$ may be carried out as follows: an electron source comprising a thermionic cathode is heated by a heat source to release free electrons therefrom; electrons are emitted from the thermionic cathode using a thermionic (TI) effect; an electric field is generated such as to supply an energy field sufficient to dissociate gas molecules using dissociative attachment effect; introducing the electrons and the gas molecules into a reactor (e.g. reaction chamber), where the electrons dissociate gas molecules to the product compounds.

The heating of the electron source preferably includes supplying thermal energy (e.g. solar radiation) to the electron source thereby raising the electron source temperature and generating thermionic electrons emission from the thermionic cathode. The generation of the electric field may include concentration of the thermal energy and directing it onto an electric field generator.

The thermionic (TI) effect and the electric field generation may be activated by the same thermal energy source, e.g. a solar energy concentrator. The latter may include collection of sunlight radiation, concentration thereof and reflection towards the electron source.

In some embodiments of the invention, gas molecules may be pre-heated before their introduction into the reaction chamber. The pre-heating of gas molecules may be performed using the same thermal energy source operable to activate the thermionic (TI) effect and the electric field generation, for example using at least one heat exchanger.

The number of emitted electrons may be enhanced by applying an electric field to the electron source.

The negative oxygen ions may be conducted through a membrane towards an electron collector; the excess electrons released by the oxygen ions may be combined to form $O_2$ molecules; and the electrons may be recycled back to the electron source. Additionally, the electrons, which did not interact with gas molecules, may also be recycled.

In some embodiments, the electric field may be used to perform electrolysis of the gas ($CO_2$ and/or $H_2O$) on the surface of the membrane, either subsequent to or independent of the dissociative attachment process. The oxygen ions are then conducted through the membrane follow the electrolysis.

The method comprises supplying the $CO_2$ and $H_2O$ gas molecules on the same side of the separator, or on opposite sides of the separator.

In some embodiments, the $CO_2$ is introduced on the cathode side of the membrane, while the $H_2O$ is introduced on the anode side of the membrane. In this case, the dissociations of $CO_2$ and $H_2O$ take place on opposite sides of the membrane and the membrane conducts oxygen ions from the cathode to the anode and protons ($H^+$) from the anode to the cathode.

In some embodiments, the method comprises $CO_2$ trapping by separating $CO_2$ from other combustion emission gases and recycling.

The method may comprise coating at least a part of the thermionic cathode to enable electron transmission via tunneling.

In other embodiments, the method comprises exposing the gas molecules to a radiation or an electrons beam, magnetic, or electric field (e.g. fluctuating field at different orientation) to increase the vibration energy of the gas molecules.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

Figure 1A:
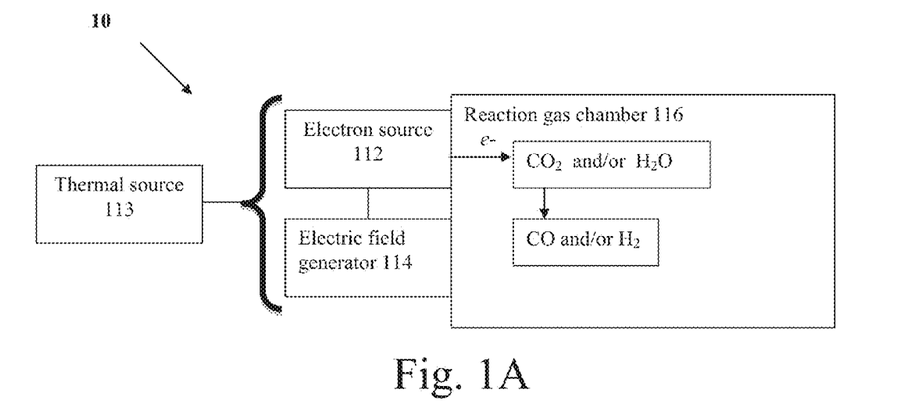
FIGS. 1A and 1B schematically illustrate a block diagram of a system according to one embodiment of the present invention.

Reference is made to FIG. 1A representing a schematic block diagram of the main functional elements of the system of the present invention. System 10 comprises an electron source 112 configured and operable to emit electrons, the electron source 112 is exposed to a thermal energy source 113 raising the temperature of the electron source 112; an electric field generator 114 generating an electric field adapted to supply an energy field sufficient to dissociate gas molecules ($CO_2$ and/or $H_2O$), the electric field generator being exposed to thermal energy flux, either from the thermal energy source 113, or from the electron source 112, or both; a main reaction gas chamber 116 configured and operable to cause interaction between the electrons with $CO_2$ and/or $H_2O$; such that the electrons dissociate $CO_2$ and/or $H_2O$ to CO and $H_2$ respectively and negative oxygen ions via dissociative electrons attachment (DEA) within the chamber and/or electrolysis.

The system and method of the present invention provide a low cost, high efficiency cycle that can be used on a large scale for producing fuel without adding $CO_2$ to the environment. The process involves $CO_2$ trapping→$CO_2$ reduction to CO in a clean process→direct CO consumption or its conversion to other fuels (e.g. methanol) and their consumption→$CO_2$ trapping and recycling.

The method of the invention utilizes concentrated thermal radiation (e.g. solar radiation or another heat source) for reducing $CO_2$ to CO and $H_2O$ to $H_2$ via a dissociative electrons attachment (DEA) method and electrolysis, using a series of coupled energy conversion steps, including (i) thermionic (TI) emission of electrons, (ii) generation of electric potential to supply the required energy field, using means which convert thermal radiation to electrical potential, e.g. thermoelectric (TE) device, Stirling engine, etc. (iii) $CO_2$ and/or $H_2O$ reduction by the dissociative attachment of electrons, $$CO_2 + e^- \Rightarrow CO_2^- \Rightarrow CO + O^- \quad (3a),$$

$$H_2O + e^- \Rightarrow H_2O^- \Rightarrow H_2 + O^- \quad (3b),$$

(iv) $CO_2$ and/or $H_2O$ dissociation via electrolysis, (v) separation of CO and oxygen, and (vi) de-ionization of the oxygen ions and recycling of their electrons. In some embodiments, at the same time, steam located on the anode side of the membrane is dissociated and the $H^+$ ions are conducted from the anode to the cathode, while $O^-$ ions are conducted from the cathode to the anode.

Figure 1B:
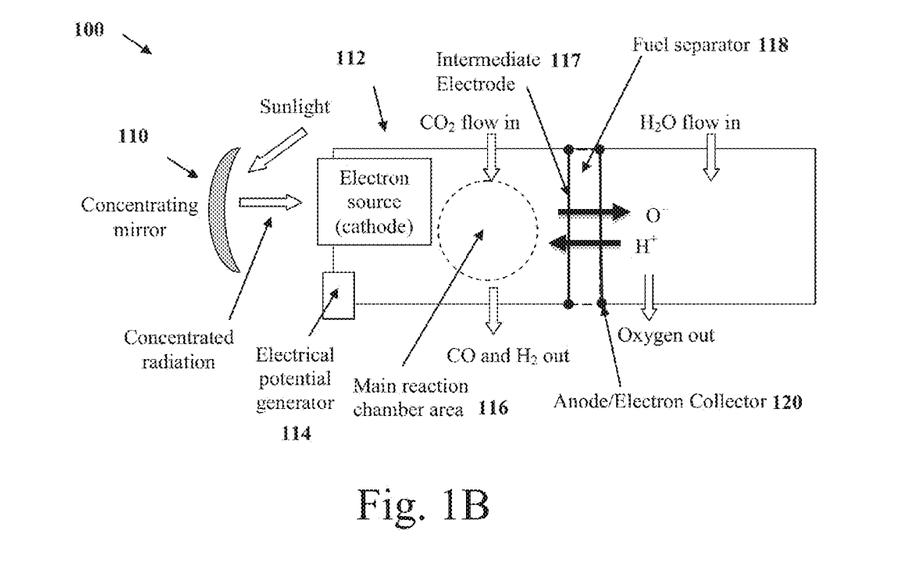

Reference is made to FIG. 1B illustrating a more detailed schematic block diagram of an example of a system, generally designated 100, configured and operable according to the invention. System 100 includes a free charged particles (electrons) source device 112 exposed to solar energy preferably through a solar energy collector 110; an electric field generator 114; a main reaction chamber 116; intermediate cathode 117; a separator 118, and anode 120 on which the electrons are collected and returned to the electron source 112. The system components are integrated in a compact cell. By coupling energy conversion methods, the system of the present invention utilizes nearly all the input energy (minus re-radiation losses) in either its thermal, electric or chemical conversion mechanisms.

The solar energy collector 110 may include one or more reflectors (e.g. mirrors) which collect and concentrate sunlight, and reflect it towards the electron source 112 to raise its temperature. As illustrated in the example of FIG. 1B, the solar energy collector 110 may include a single mirror shaped as a parabolic dish. It should be understood that any other heat source that can provide the required temperature and energy flux to the electron source could be used instead of solar radiation.

The electron source may be a high efficiency electron source using the thermionic effect, operating in a $CO_2/CO/O_2/O^-$ gas surrounding. The thermionic effect refers to the thermionic emission of a flow of charged electrons from a heated surface, caused by thermal vibrational energy, overcoming the electrostatic forces holding electrons to the surface. The electron source may be formed by a thermionic cathode associated with an appropriate electric field enhancing the electron emission. The required temperatures may be achieved by concentrating solar radiation towards the cathode.

The lifetime of some of these cathodes can be thousands of hours, but in some cases they should preferably be protected (e.g. by coating) from exposure to a gaseous environment. Some of these high current cathode materials are sensitive to carbon dioxide, carbon-monoxide, oxygen and hydrogen. The cathode may therefore be coated with a thin oxide layer of a few nanometers to protect its surface from atoms and ions bombardment. Furthermore, the coating may enable electron transmission via tunneling, assuring that the effective work function is reduced, while protecting the thermionic material from reaction chamber gases, namely $CO_2$, CO, $O^-$ and $O_2$. Several combinations of metals and their oxides may be used; such as Al/Aluminum oxide/Au or Al combinations, Ta/Tantalum oxide/Pt combination, Titanium/Titanium-oxide, Scandium/Scandium-oxide, Zirconium/Zirconium-oxide, Tungsten/Tungsten-oxide, and Hafnium/Hafnium-oxide.

Other combinations like Tungsten/Scandium oxide and Lanthanum Hexaboride/oxide are also possible. Carbides, nitrides and other materials may also be used as thermionic electron sources (cathodes).

It should be noted that the number of emitted electrons is increased when the electric field, e.g. between the cathode 112 and the intermediate electrode 117, is increased. The electric field reduces the potential barrier of the cathode surface and then, more electrons can escape from the cathode surface. The applied voltage determines the electron energy. The characteristics of the barrier, after applying the electric field, depend on the field intensity, the distance between the cathode and the anode, the coating thickness and the dielectric constant. The tunneling distance also depends on the electrons energy. The number of electrons passing through this oxide metal layer by tunneling depends on the oxide (insulator) layer width and on the electric field applied on the layer. As the temperature increases, the Fermi energy distribution is changed, increasing the energy of the electrons, which increases their tunneling probability. The cathode-anode distance should allow creation of a sufficiently high electric field inside the insulator, but the field should not be higher than the breakdown value. The desired electric field can be obtained by varying the field voltage and the cathode-anode spacing.

It should also be noted that different thermionic cathode/coating combinations having different electron emission capability as a function of temperature, applied voltage, electric field intensity and the adjacent medium (vacuum, inert gas, $CO_2$ gas) may be used. The working temperatures may be in the range of about 600° C.-1500° C. Each of these thermionic cathode/coating combinations has different potential barrier, which yields different electron tunneling probability for a given applied electric field. For a maximum dissociative probability of the $CO_2$ molecule, the electron should have energy of about 4.4 eV. After the release of the electrons, if the applied voltage is higher than needed (4.4 V), another set of decelerating electric fields can be applied to reach the needed electron energy.

Since the system operates at high temperatures (600° C.-1500° C.), the electric field generator (e.g. a thermoelectric device or a Stirling engine) may generate the electric field needed for the Thermo-Field (T-F) emission (i.e. the combined effect of temperature and electric field emission). The use of a thermoelectric or a Stirling engine device in combination with the thermionic cathode enables: (i) operation at high temperature and (ii) use of the excess thermal energy generated from the thermionic cathode to heat the thermoelectric device or a Stirling engine, which generate electric potential, and then the inlet gas. A Stirling engine, which has a relatively high heat-to-electricity conversion efficiency, could be used instead of the thermoelectric cascade. By properly combining the various energy conversion processes, the system efficiency is maximized.

The free electrons, energized by the electric field, enter the main chamber, where they collide with heated reactant gas molecules ($CO_2$ and/or $H_2O$). At least a portion of the thermal energy may be used to heat the reactant gas, to emit electrons from the electron source and to generate electric potential in the electric field generator. The product compounds leaving the system can also be used to pre-heat the incoming reactant gas. When the electrons impact the gas molecule, the dissociative attachment process described by equations (3a) and (3b) above is initiated and CO and/or $H_2$ are produced. The product $O^-$ ions exit chamber 116 via the separator 118, which is in the form of a gas separation membrane (based on electric field separation). The CO and/or $H_2$ exit the system directly from the main chamber 116. The electrons energy level is raised to energy cross-section required for the DEA reaction by the electrical field generator and the electron source. The electron energy cross section determines the probability of the process to occur. The electron energy cross sections peak at 4.4 eV, 8.8 eV and 13.2 eV. Between these values, the probability drops sharply. For high temperature (1200K), the probability of 4.4 eV and 8.8 eV are about the same. Therefore, the preferable choice for the electron energy is the lower energy requirement (4.4 eV).

The number of electrons combining with the $CO_2$ and/or $H_2O$ and creating $O^-$ ions should be maximized. Electrons, which do not combine with the gas by dissociative attachment, can react with the $CO_2$ and/or $H_2O$ by means of electrolysis on the intermediate electrode 117. Electrons are separated from the ions and collected on the electron collector (anode) 120 and returned to the electron source 112. It is desirable that only electrons from the $O^-$ ions would reach that stage.

Recombination and other adverse reactions such as the following reactions (4-6), should be avoided:

$$CO + O^- \Rightarrow CO_2 + e^- \qquad (4)$$

$$O^- + 2CO_2 \Rightarrow CO_3^- + CO_2 \qquad (5)$$

$$CO_3^- + CO \Rightarrow 2CO_2 + e^- \qquad (6)$$

To this end, the CO must be separated from the $O^-$ ions. This can be done using ceramics membrane materials, which allow only certain atoms (e.g. oxygen ions) to pass through them. Yitria stabilized Zriconia (YSZ) can be used to conduct oxygen molecules for $CO/O^-$ separation. The oxygen ions are then separated from the CO molecules by applying an electric field. The CO molecules continue their trajectory while the oxygen ions are drawn through the YSZ membrane towards the anode. The drift velocity of the ions should allow higher diffusion rate than their production in main chamber 116. When reaching the anode 120, the electrons are dissociated from the $O^-$ ions and pass therethrough back to the electron source 112. The oxygen is then separated from the CO. $O_2$ molecules are formed, once the surplus electrons are given up and exit the system adjacent to the anode 120.

YSZ and other ceramics membranes can conduct electrons at a certain temperature range. It should be noted that other materials, such as the combination of Pt-YSZ, might be useful in the process together with, or instead of YSZ. Mn/Fe-based perovskite type oxide having high oxygen permeability at high temperature can also be used. In the DEA process, the membrane oxygen permeability rate should be higher than the $O^-$ ions production rate.

It should be noted that as the temperature increases, the mobility of the oxygen is increased. A stronger electric field also increases the ions mobility and therefore the ability to separate them from the CO gas. At energy levels lower than 5 eV, the probability that other processes, besides (4)-(6), would occur is very low (the cross section for electron attachment is too low). To have a maximum attachment cross section, the electron energy required in the system of the present invention is about 5 eV.

Electrolysis can take place across the intermediate electrode 117, the separator 118 and the anode 120 in two ways:
(a) Both $CO_2$ and $H_2O$ are introduced into the main chamber 116. Then, preferably but not necessarily, following the dissociative electrons attachment (DEA), $CO_2$ and $H_2O$ molecules that remain in the chamber are dissociated via electrolysis. The product $O^-$ is conducted through the membrane, while the CO and $H_2$ exit the main chamber.

(b) $CO_2$ is introduced to the main chamber 116, while $H_2O$ is entered into the chamber on the anode side of the membrane. $O^-$ resulting from $CO_2$ dissociation is then conducted through the membrane from the intermediate electrode to the anode, while $H^+$ is conducted in the opposite direction, from the anode to the cathode, as illustrated in FIG. 1B. It should be understood that the conduction of $O^-$ and $H^+$ are taking place in different mechanisms, which do not compete with one another. One the protons reach the intermediate electrode 117 they react with electrons and recombine to form $H_2$, which exits in the system together with the CO.

Figure 2:
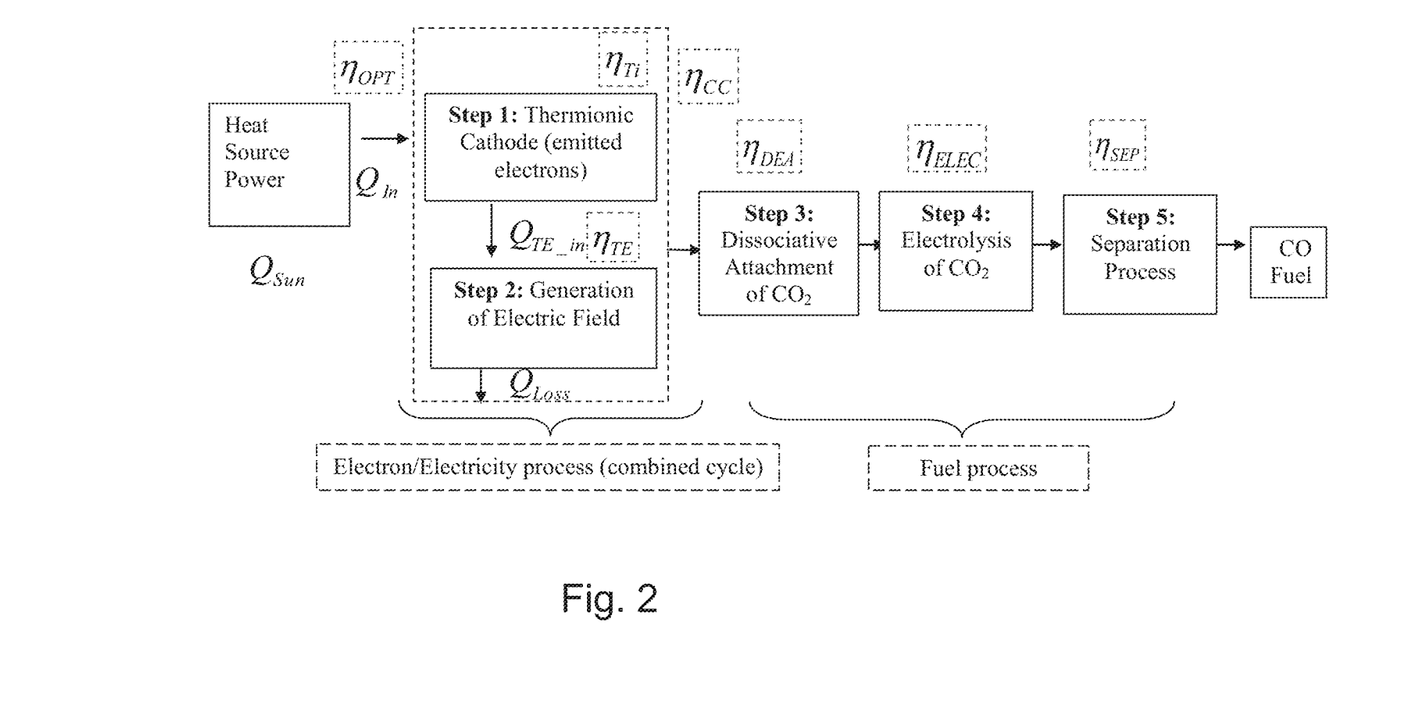
FIG. 2 schematically illustrates a flow chart of a proposed method according to another embodiment of the present invention.

Reference is made to FIG. 2 schematically representing an example of a method of the invention for producing fuel, and the efficiencies of the various steps. In some embodiments, the method uses concentrated solar radiation for reducing $CO_2$ to CO via a combination of dissociative electrons attachment (DEA) and high temperature electrolysis. This technique combines photo, thermal, electric and chemical processes to maximize the efficiency and the conversion rate of solar radiation to chemical potential in the form of $CO_2$ reduction to CO and $O_2$. More specifically, an electron/electricity process occurs by photons (sun power) interaction with a thermionic cathode, resulting in emission of electrons (step 1), and thermoelectric generation of an appropriate electric field (step 2) to thereby supply the required energy field. Then, the fuel synthesis occurs, including $CO_2$ reduction by the dissociative attachment of electrons (eq. 3a-3b above) (step 3) and electrolysis (step 4), followed by separation of CO and oxygen, de-ionization of the oxygen ions and recycling these electrons (step 5), resulting in the CO fuel formation. The same process can be done for water dissociation, either separate from, or simultaneously with the $CO_2$ dissociation process.

As indicated above, carbon monoxide and/or hydrogen can then be used directly as a gaseous fuel (e.g. in power or chemical plants) or converted to methanol or hydrocarbons. The $CO_2$ generated during the burning of these fuels is trapped, returned to the power plant and reduced again.

Thus, according to the invention, the reduction of $CO_2$ to CO and $O_2$ is performed via dissociative electrons attachment method (DEA) and high temperature electrolysis, using a series of coupled energy conversion steps.

The conversion of concentrated solar energy to free electrons with prescribed energy by combining thermionic and either several thermoelectric stages or Stirling engine, is most efficient when the upper temperature is in the range of about 1000° C.-1400° C. The dissociative electrons attachment (DEA) process then uses the free electrons, which interact with the gas molecules. Some of these steps are actually done in mass spectrometers and similar devices that produce negative or positive ions in high vacuum. The efficiency of the process is enabled by the use of concentrated solar energy (the required concentration ration would typically be larger than 2000), the use of high temperature (T=1000-1400° C.), and the coupling of several energy conversion steps to minimize losses, and the use of the best fitted materials for the thermionic cathode and the membrane adjacent to the anode.

A similar method can be used for water splitting via reaction (3b):

Processes (3a) and (3b) are both in the gas phase and use free electrons at a specific energy range (cross section) to create a negative molecule. The molecule is then dissociated to produce a fuel such as $H_2$ or CO. Molecules that were not dissociated via DEA can be dissociated via electrolysis. Negative oxygen ions are separated from the fuel (CO & $H_2$), and the electrons are released and circulated back to start the process over.

The thermionic (TI) and electric field generations processes are arranged as a combined cycle (the region surrounded by a dash-line in FIG. 2), meaning the heat that is not utilized by TI process can be used at a lower temperature for the electric field generator. The electron energy and the electric potential are then used to initiate the dissociative attachment (DEA) process of pre-heated $CO_2$, the subsequent electrolysis, and the separation of the O from the CO and/or $H_2$. Thus, the energy is converted to chemical potential in the form of fuel made of CO and/or $H_2$.

The combined cycle efficiency is: $\eta_{CC} = \eta_{TI} + \eta_{TE} - \eta_{TI} \cdot \eta_{TE}$ (9)

where the thermionic efficiency is marked as and the thermoelectric efficiency is marked as $\eta_{TE}$.

The thermionic efficiency $\eta_{TI}$ is defined as the electrons power, which is the current I times the work function divided by the electron charge (i.e., expressed in Voltage units), divided by the rate of heat that reaches the cathode:

$$\eta_{Ti} = \frac{I \cdot \phi / e}{Q_{in}}$$ (10)

The current is determined as $I = J^* A_{surf}$, where J is the current density and is defined by the Richardson-Dushmann equation and $A_{sur}$ is the surface area of the thermionic element. $\Phi$ is the material effective work function.

The thermoelectric efficiency $\eta_{TE}$ is the electrical power generated by the thermoelectric generator divided by the incoming heat rate that reaches it from the TI cathode (e.g. via re-radiation, etc.), or directly from the heat source (e.g. solar radiation). The electrical work is used to provide the electrons (from the TI cathode) with the needed kinetic energy:

$$\eta_{TE} = \frac{P_{(electical\_power)}}{Q_{TE\_in}} = \frac{V \cdot I}{Q_{TE\_in}}$$ (11)

The fuel production process includes the DEA, the electrolysis and the separation processes, has an efficiency defined as:

$$\eta_{Fuel} = \eta_{DEA} \cdot \eta_{ELEC} \cdot \eta_{Sep}$$ (12)

where the dissociative electron attachment efficiency is marked as $\eta_{DEA}$, the electrolysis reaction is marked as $\eta_{ELEC}$, and the fuel separation efficiency is marked as $\eta_{SEP}$.

The dissociative electron attachment efficiency $\eta_{DEA}$ is defined as the number of electrons participating in the DEA process (Eq. 3, above), relative to the incident electrons from the TI cathode:

$$\eta_{DEA} = \frac{N_{e\_DEA}}{N_{TI\_electrons}}$$ (13)

The electron beam intensity along their heading direction, x, is:

$$N_{e\_DEA} = N_{TI\_electrons} \cdot [1 - \exp(-N \cdot q_d \cdot x)]$$ (14)

where $q_d$ is the DEA cross section for $O^-/CO_2$ process, N is the $CO_2$ molecules density which depends linearly on the pressure and oppositely linearly on the temperature, and X is the electron heading direction.

The fuel separation efficiency $\eta_{SEP}$ is defined as the number of CO molecules that exit the system after separation from the oxygen ions relative to the number of $CO_2$ molecules dissociated in the DEA process:

$$\eta_{SEP} = \frac{N_{CO}}{N_{CO2\_dis}} \quad (15)$$

The total system efficiency $\eta_{Sys}$ is:

$$\eta_{Sys} = \eta_{Heat} \cdot \eta_{CC} \cdot \eta_{Fuel} \quad (16)$$

where $\eta_{Heat}$ is the efficiency of the heat supply to the system, $\eta_{CC}$ is the combined cycle efficiency and $\eta_{Fuel}$ is the fuel production efficiency. If the heat source is concentrated solar energy, $\eta_{Heat} = \eta_{OPT}$, where $\eta_{OPT}$ is the optical efficiency of the solar concentrator.

The optical efficiency of the solar concentrator $\eta_{OPT}$ is defined as the power of the radiation reaching the thermionic surface, divided by the solar radiation upon the concentrator:

$$\eta_{OPT} = \frac{Q_{in}}{Q_{Sun}} \quad (17)$$

The maximum system efficiency can be estimated with the following assumptions. For a solar flux of 1000 W/m$^2$, and a total current of 200 A (assuming 20 A/cm$^2$) and assuming that $\eta_{Fuel}=1$, $\eta_{OPT}=0.9$, the theoretical system efficiency will be 55%. For a total current of 300 A (30 A/cm$^2$), the maximum theoretical efficiency will increase to 84%.

It is useful to compare the efficiency of the process of the present invention to that of $CO_2$ or $H_2O$ reduction via electrolysis only, without the other components of the present invention. In the latter, the maximum efficiency depends on the efficiency of the electricity production. For example, if the maximum efficiency of a solar-driven electricity generation would reach about 40% (which is very high relative to existing methods), the system efficiency of fuel production via electrolysis could then reach about 35%. Therefore, the efficiency of the system of the present invention is considerably higher than that of $CO_2$ or $H_2O$ electrolysis.

Figure 3:
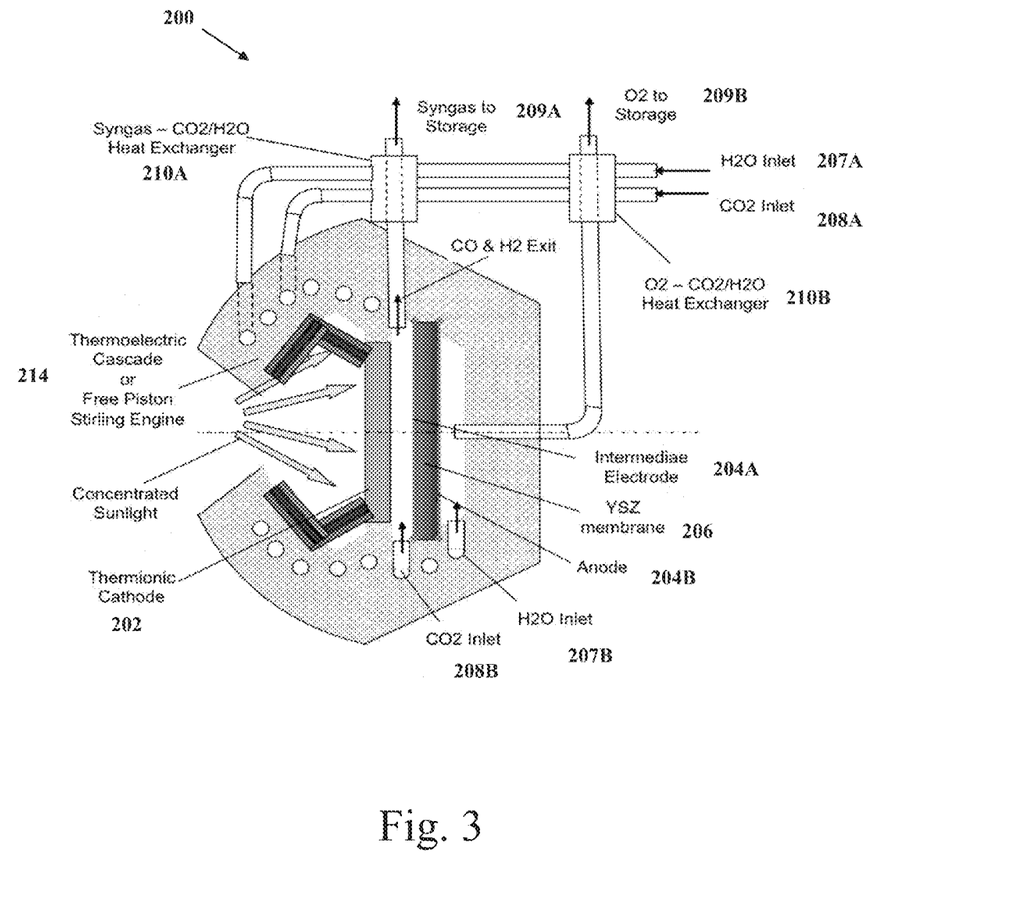
FIG. 3 schematically illustrates an example of configuration of a module of the system of the present invention.

Reference is made to FIG. 3 presenting an example of a configuration of a module of the system of the present invention. It should be noted that the system module 200 does not include a solar energy collector, although the system configuration allows its addition later. The figure illustrates the dissociation of $CO_2$ and $H_2O$ in the same system.

The system 200 includes an electron source including a thermionic cathode 202 exposed to concentrated sunlight, (an electric field generator illustrated by a thermoelectric element 214 or a cascade of several such elements, or another device such as Stirling engine (e.g. free piston), an intermediate electrode 204A spaced from the cathode 202 at a predetermined distance defining a main reaction chamber zone, a separator illustrated by a YSZ membrane 206, and the anode 204B. The anode 204B is used to separate H$^+$ ions (protons) from OH$^-$. The membrane 206 is used to conduct O$^-$ ions from the intermediate electrode 204A to the anode 204B, and H$^+$ ions from the anode 204B to the intermediate electrode 204A. $CO_2$ inlet 208A and $H_2O$ inlet 207A are provided for supplying the $CO_2$ gas and the $H_2O$ gas respectively. The inlet gases flow first via a first heat exchanger 210B, where they are heated by the exiting $O_2$, and then through a second heat exchanger 210A, where they are heated by the existing syngas (mixture of CO and $H_2$). Further downstream, the inlet gases enter the housing of the module, flowing adjacent to the hot internal components (e.g. 214) and are further heated before the $CO_2$ enters the main reaction zone between the thermionic cathode 202 and intermediate electrode 204A, while the $H_2O$ enters the reaction zone adjacent to Anode 204B. Outlet 209A exits the product syngas (CO and $H_2$) to storage via the heat exchanger 210A. Outlet 209B exits the $O_2$ to storage via the second heat exchanger 210B.

The distance between the intermediate electrode 204A and the cathode 202 may be changed to adjust the influence of the electric field and the applied potential. The intermediate electrode 204A enables the performance of electrolysis and the adjustment of the electric fields in the reaction zone (between 202 and 204A) and across the membrane (between 204A and 204B). The system 200 may be designed to operate under pressures of 0.1-10 atmospheres and at temperatures of 600°-1500° C. The anode 204 is connected to the cathode 202 to recycle the electrons. An electric field may be generated from an external power source and controlled independently, either in addition to or without using the electric field generator 214. The thermoelectric (TE) or Stirling generator 214 may be heated, either from an independent source, or by re-radiation from the thermionic cathode to then generate the required electric potential. The cathode should have a high current density and be able to sustain many hours of continuous work at high temperature. The current density depends on the temperature and the electric field.

Figure 4:
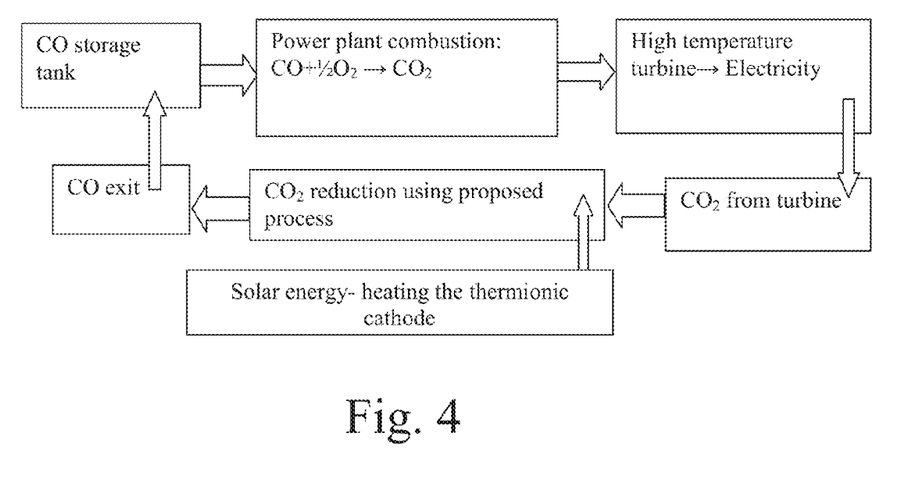
FIG. 4 schematically illustrates one example of using the CO gas to produce electricity via the $CO_2 \rightarrow CO \rightarrow CO_2$ close cycle.

Reference is made to FIG. 4 illustrating one possible way of using CO gas produced in the method of the present invention. CO may be produced by using $CO_2$ supplied by emission of a turbine using solar energy and the method of the present invention. After exiting the production stage, the CO is stored and used as a combustion fuel to drive the turbine and generate electricity. The $CO_2$ formed in the combustion process is then returned to the CO production stage, and so on.

Figure 5:
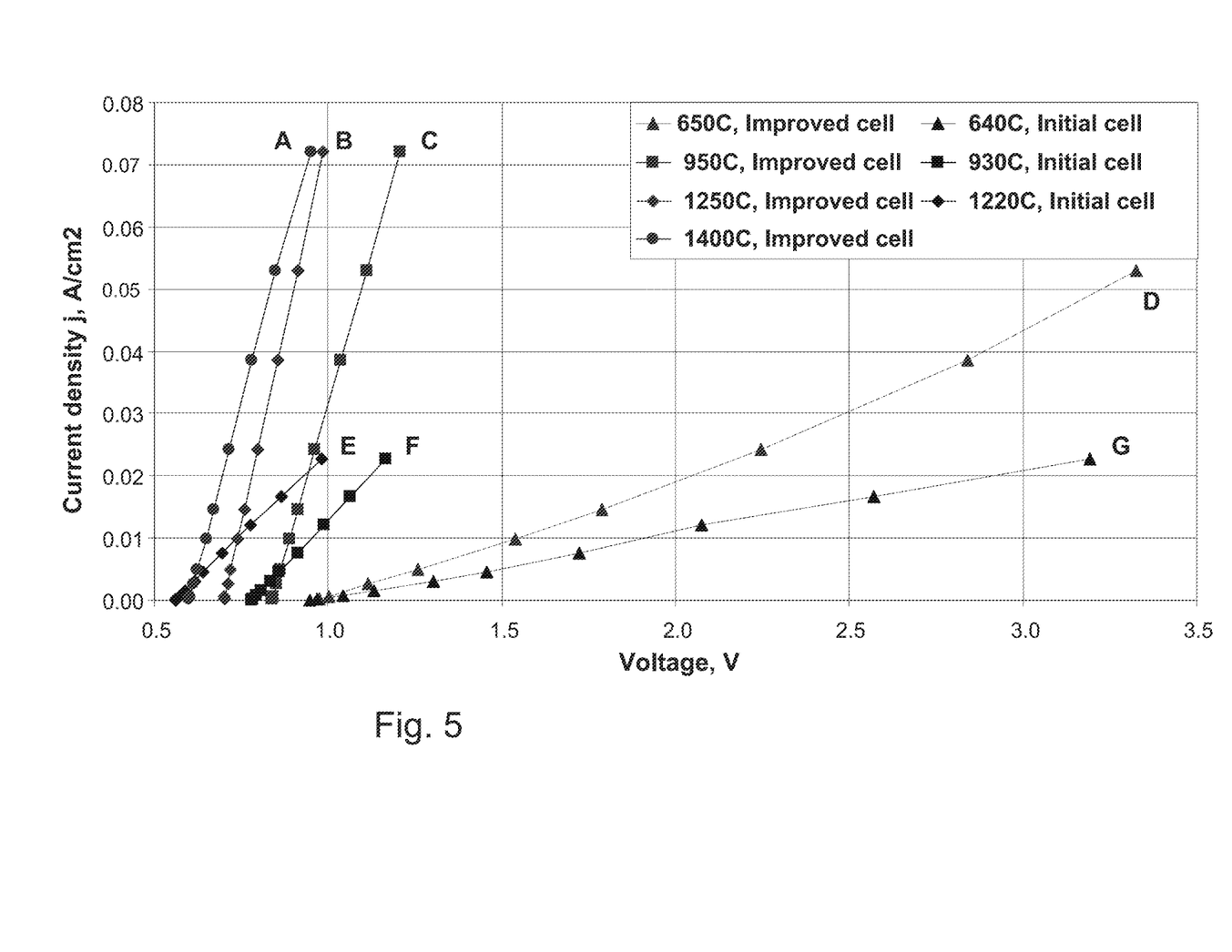
FIG. 5 shows the I-V curves in an electrolytic cell providing $CO_2$ dissociation as a function of temperature.
Figure 6A:
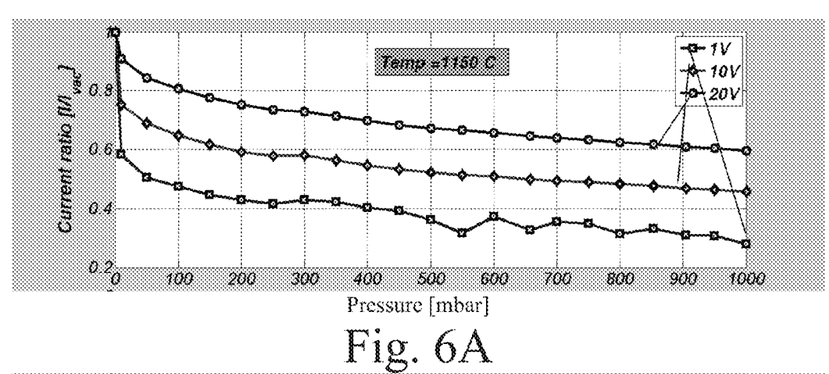
FIGS. 6A and 6B show thermionic electron emission in $CO_2$ gas at a temperature of 1150° C. (6A) and at a temperature of 1320° C. (6B)
Figure 6B:
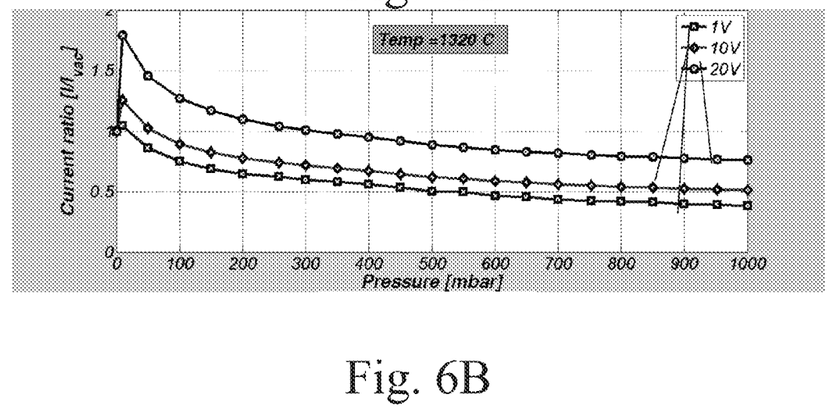
Figure 7:
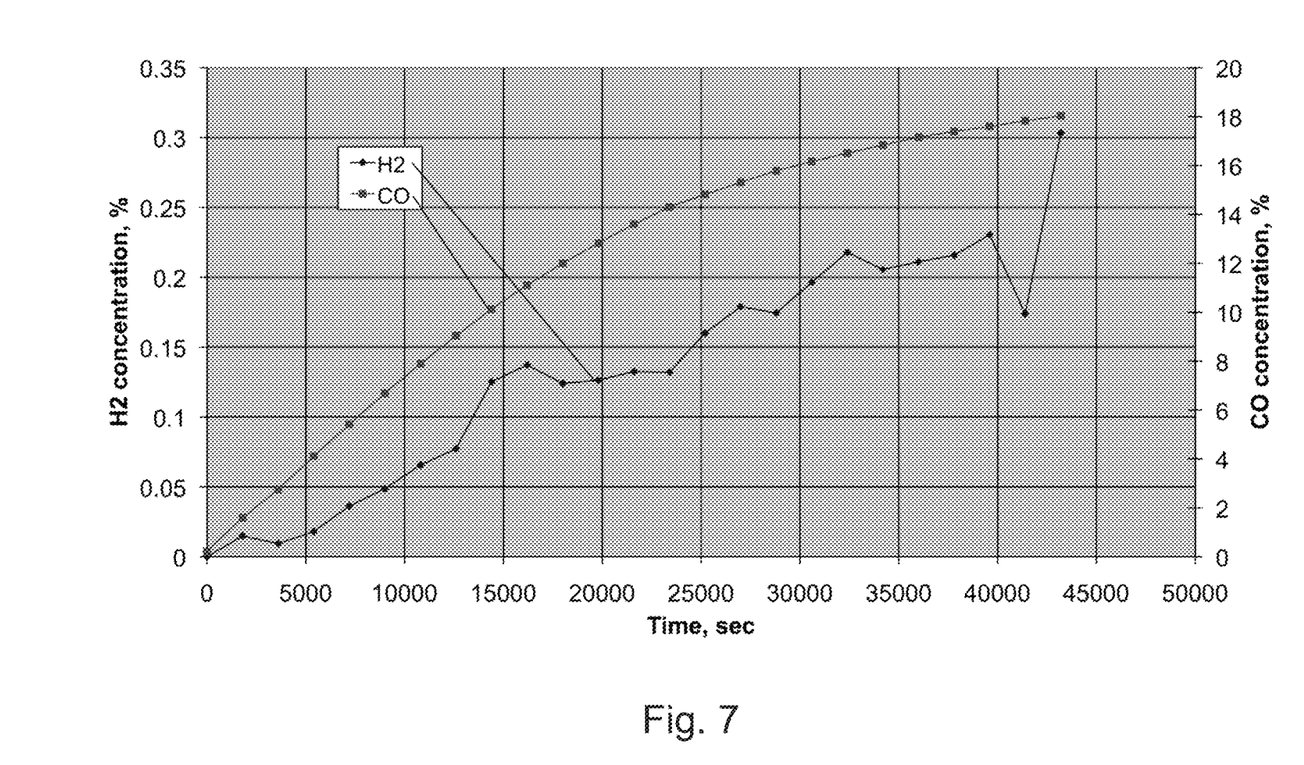
FIG. 7 illustrates the concentration of CO and $H_2$ during tests with $CO_2$ on the cathode side and humid air on the anode side at a cell temperature of about 650° C.

FIGS. 5, 6 and 7 provide a sample of the data obtained from measurements with the main components of the system of the present invention.

Reference is made to FIG. 5 illustrating laboratory measurements of I-V (Current-Voltage) curves in an electrolytic cell, configured by using the teachings of the present invention. The current is generated by the conduction of oxygen through the separating membrane and therefore indicates the rate of $CO_2$ reduction via the electrolysis. A remarkable increase in the reaction rate occurs as the temperature increases from 640° C. (Curves D and G) to 950° C. (Curves C, E and F). A smaller increase is seen as the temperature increases from 950° C. to 1250° C. and 1400° C. (curves B and A, respectively). The cell improvement indicated in the figure legend is primarily in the intermediate electrode and the anode. As described above, the system of the present invention may combine this electrolysis cell with a thermionic cathode and reaction chamber. Measurements with these components are presented in FIG. 6.

Reference is now made to FIGS. 6A and 6B illustrating a thermionic Electron Emission from a cathode made of CeB$_6$ into $CO_2$ gas at a temperature of 1150° C. (6A) and at a temperature of 1320° C. (6B). The current ratios refer to the electron current at a given test pressure, relative to the current at the maximum vacuum used in the measurements. The graphs show the ability of a cell based on the principles of the present invention to efficiently emit electrons using the thermionic effect at a pressure of up to one atmosphere. The reduction of current with increasing pressure is relatively small, indicating that operation at ~1 bar is feasible.

Reference is now made to FIG. 7 illustrating the evolution of CO and $H_2$ concentration inside an electrolytic reaction cell. The test temperature in this case is 650° C. At the beginning of the tests, the reaction cell is evacuated and then is filled with $CO_2$ at about 1.1 bars. As the temperature is increased and the electric potential is applied, the CO concentration in the cell increases over time. In this test, the cell is surrounded by air with a humidity of about 9.5 gram-$H_2O$ per 1 kg-air. As seen in the figure, the concentration of $H_2$ inside the cell also increases due to electrolysis of the $H_2O$ in the surrounding air and conduction of protons through the membrane into the cell.

The invention claimed is:

1. A system for simultaneously dissociating reactant gases being $CO_2$ and $H_2O$ by electrolysis, the system comprising: a reactor comprising a membrane having first and second opposite surfaces, operative as respectively an anode and a cathode, a first gas inlet configured and operable to enable providing $CO_2$ at the second surface of said membrane and a second gas inlet configured and operable to enable providing $H_2O$ at said first surface of said membrane, said membrane being operative as a gas separator to dissociate the reactant gases, an electric generator configured and operable for utilizing energy derived from solar radiation and generating an electric potential sufficient to dissociate the reactant gases, and a heater configured and operable to utilize thermal energy derived from solar radiation for pre-heating the reactant gases prior to dissociation, the dissociation of the reactant gases to product compounds being carried out by separating $O^-$ ions from CO and separating $H^+$ ions from $OH^-$ ions, by conducting oxygen ions from the cathode to the anode side simultaneously with conducting of $H^+$ ions from the anode to the cathode side.

2. The system according to claim 1, wherein the rates of conducting the $O^-$ and the $H^+$ ions are controlled by at least one of: electric potential, working temperature, flow rate of $CO_2$ or of the mixture $CO_2$ and $H_2O$ at the second surface, and $H_2O$ at the first surface.

3. The system of claim 1, wherein the reactant gases are pre-heated to a temperature being in the range that extends from about 600° C. to about 1500° C.

4. A method for simultaneously dissociating molecules of reactant gases being $CO_2$ and $H_2O$, the method comprising:
pre-heating the reactant gases;
supplying the pre-heated reactant gases' molecules to a reactor including a membrane configured and operable as a gas separator, wherein said membrane comprising a first surface operative as an anode and a second surface operative as a cathode;
providing $CO_2$ at the second surface of said membrane and $H_2O$ at said first surface of said membrane, and applying an electric field in the reactor to generate an electric potential sufficient to dissociate the reactant gases by electrolysis; separating between the dissociation products by emission of $O_2$ molecules from the first surface and emission of CO and $H_2$ from said second surface; and discharging the product compound molecules from said reactor; and wherein the energy required to dissociate said reactant gases comprises a first portion being thermal energy used for the pre-heating of the reactant gases and a second portion being electric energy for generating said electric potential, and wherein said first and second portions are both derived from solar radiation, and wherein said method further comprising separating $O^-$ ions from CO and separating $H^+$ ions from $OH^-$ ions, by conducting oxygen ions from the cathode to the anode side simultaneously with conducting of $H^+$ ions from the anode to the cathode side.

5. The method of claim 4, wherein the rate of conducting the oxygen ions from the cathode to the anode side and the rate conducting $H^+$ ions from the anode to the cathode side are both controlled by at least one of: electric potential, working temperature, flow rate of $CO_2$ at the second surface, and $H_2O$ at the first surface.

* * * * *